May 29, 1962 — C. R. KELLEY — 3,037,201
CONTROL CIRCUIT
Filed Sept. 2, 1958 — 3 Sheets-Sheet 1

DEPTH ERROR
PRESENT — PREDICTED IN 7 SEC.

INVENTOR.
CHARLES R. KELLEY
BY Ervin B. Steinberg
AGENT.

May 29, 1962 C. R. KELLEY 3,037,201
CONTROL CIRCUIT
Filed Sept. 2, 1958 3 Sheets-Sheet 3

INVENTOR.
CHARLES R. KELLEY
BY
Erwin B. Steinberg
AGENT.

United States Patent Office 3,037,201
Patented May 29, 1962

3,037,201
CONTROL CIRCUIT
Charles R. Kelley, Stamford, Conn., assignor to Dunlap and Associates, Incorporated, Stamford, Conn., a corporation of New York
Filed Sept. 2, 1958, Ser. No. 758,426
11 Claims. (Cl. 340—179)

This invention relates to a control circuit and has particular reference to a system in which signals from a controlled instrumentality are utilized as input signals to a simulator which simulates the operation of the instrumentality and whereby the simulator operates on an accelerated time basis in order to indicate the predicted condition of the instrumentality. In this manner an operator attending the controlled instrumentality may take the necessary action, usually by adjusting controls, so as to maintain the instrumentality at its proper operating conditions, long before the instrumentality would operate outside of the desired limits.

This invention therefore, provides the operator of a controlled instrumentality with data concerning the anticipated condition of the instrumentality thereby enabling the operator to maintain the instrumentality within close limits, avoid dangerous conditions, and effect appropriate action prior to the actual occurrence of such events.

It will be apparent that the instant invention will be particularly useful in the operation and control of such instrumentalities as aircraft, ships, submarines, missiles, torpedoes, space vehicles, land vehicles, elevators, industrial processes, power generating plants, nuclear reactors and many other instrumentalities of a similar nature.

Manual control of an instrumentality of the type indicated above normally depends upon information about the system controlled, the data being either sensed directly via human sense organs, or indirectly via a sensing instrument transmitting the information to some form of indicator. This information enables the operator of the instrumentality to make the control movements by which the state of the instrumentality is adjusted.

Two principal varieties of instruments are used in control: "status" instruments and "command" instruments. Status instruments give the operator information about the present or past state of the system, e.g. "145 degrees F.," "65 feet," et cetera. Command instruments tell the operator what to do with the controls, e.g. "more cooling," "stop fuel," et cetera. The majority of systems rely on status instruments. Command instruments are a later development, and usually require a computing element as well as one or more sensing instruments.

Existing status instruments fail to give to the operator the information with which he is most concerned, i.e., what his system is going to do. This he must compute mentally. Since this computation may involve more than one indicator signal and complex system dynamics, it is often hard to learn and inaccurate. Other status instruments are frequently added to control systems just to improve the operator's ability to predict and to anticipate. Rate of change indicators frequently have this function. Yet they are at best an incomplete solution to the predicted problem.

Command instruments have two principal disadvantages. First, they do not require the operator to know what the system is doing, so he is operating "blind." Second, the operator using the command indicator has a severely limited range of actions he can take. In fact, a particular action has been programmed into the indicator signal in advance, and the operator is expected to follow it.

The invention described hereafter overcomes the disadvantages described above by connecting a simulating means which simulates the operation of the actual instrumentality in such a manner that the simulating means receives cyclically status information from the instrumentality. The simulating means operates on an accelerated time basis, thereby predicting very quickly the condition of the instrumentality in 5, 10 or 30 seconds hence or whatever time interval is desired. This information is made available to the operator in order that he may effect the necessary control action. It will readily be apparent that in this manner the judgment of an operator based on skill or experience is substantially eliminated and that the problem of "over-" or "under-" regulation can be avoided.

One of the objects of this invention therefore is the provision of a control circuit which overcomes one or more of the limitations and disadvantages of prior are devices.

Another object of this invention is the provision of a control circuit which is equipped with means for predicting the condition of a controlled instrumentality.

Another object of this invention is the provision of a control circuit which includes simulating means receiving input signals from an instrumentality which is under the control of an operator and the simulating means providing the operator with information concerning the future condition of the instrumentality.

Another object of this invention is the provision of a control circuit which simplifies for an operator the operation of a complex instrumentality.

A further object of this invention is the provision of a control circuit in which an operator controlling an instrumentality is kept continuously aware of the present and anticipated state and condition of the instrumentality.

Another and further object of this invention is the provision of a control circuit for a complex instrumentality in which reliability is increased, control is more precise, control operations are simplified, and operator training time is reduced.

Still other and further objects of this invention will be apparent by reference to the following description taken in conjunction with the accompanying drawings in which.

As used hereafter in the specification and claims, the expression "manual" or "manual control" or equivalent wording thereof shall include any and all controls operable by an operator, that is hand, foot, arm, knee, leg controls, et cetera, and should not be construed as being limited to hand controls.

The term "simulating means" shall be construed and interpreted as an analog of the system of instrumentality which is being controlled. Simulating means are well known in the art; reference is being made, for instance, to the "Link" trainer, which is an analog computer simulating the behavior and operation of an actual aircraft, U.S. Patent 2,099,857 to E. A. Link and others. Similar simulators have been developed by R. C. Dehmel (U.S. Patent 2,366,603 and others) to reproduce and simulate the operation of aircraft, known commercially as "flight simulators." Many other simulators are available to train personnel in the operation of submarines, and ships, moving radar targets generator to train personnel in the operation of actual radar devices, nuclear reactors, et cetera.

Still other computers, analog or digital, may be set up to reproduce and simulate the operation of industrial processes, the behavior of A.-C. networks when parallelling large power stations, solving heat transfer problems, or calculating and evaluating the design of motors, transformers, et cetera.

Typical "universal" computer components for complex problems are available commercially for instance from G. A. Philbrick, Researches, Inc., Boston, Massachusetts, or Donner Scientific Co., Concord, California, and described also in "The Electronic Analog Computer as a Lab Tool," Industrial Laboratories, vol. 3, No. 5, May 1952, or "Electronic Analog Computers," by G. A. Korn et al. (book), McGraw-Hill Book Company, New York, New York (1952).

In still another and rather simple example it will be appreciated that for instance a heat transfer problem in an actual device may be simulated by a combination of electrical resistors arranged in a network and that current flow measurements in the circuit branches may be used as a measure of heat flow.

Figure 1:
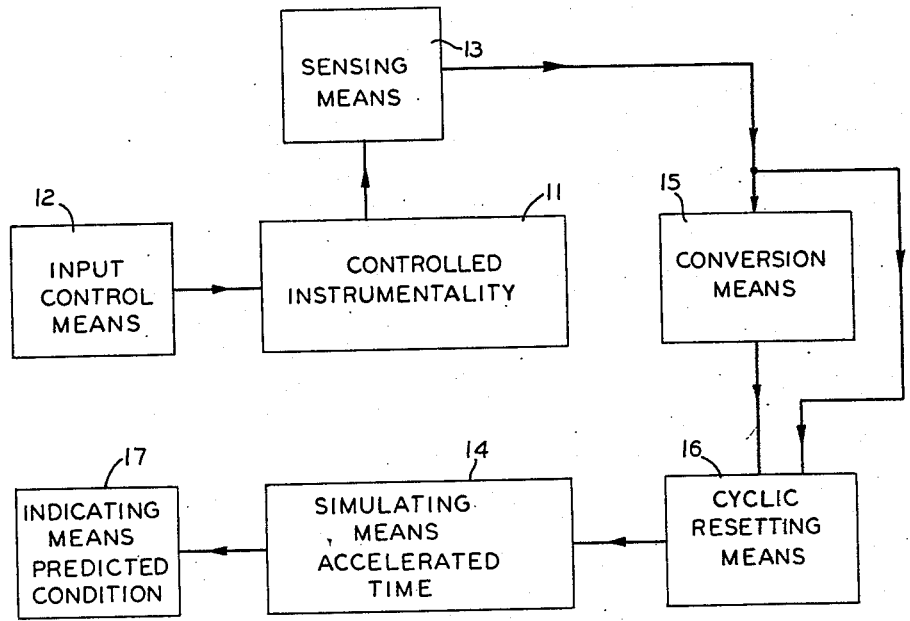
FIGURE 1 is a schematic block diagram of the invention showing all the elements necessary for constructing the control circuit.

Referring now to FIGURE 1, numeral 11 refers to a controlled instrumentality, for instance a power plant, an aircraft, a submarine, et cetera, the status of which is influenced by manually operable input control means 12, for instance, levers, switches, handles, steering wheels, pedals, et cetera. An operator or attendant operating control means 12 will therefore influence the condition of controlled instrumentality 11.

The status of instrumentality 11 is sensed by sensing means 13, these means being responsive to temperature, pressure, depth, speed, flow, length, et cetera of the instrumentality. In general, the sensing means generate signals which are functions of one or more of the following variables reflecting the state of the instrumentality:

(1) The output of the instrumentality;
(2) Derivatives of the output;
(3) Integrals of the output;
(4) Quantities affecting the output, its derivatives or its integrals.

The use of more sensing instruments can make the prediction more accurate but will usually require a more complex simulation system. The number of instruments will therefore depend on the complexity and accuracy desired.

The signals from the sensing means are applied cyclically as the initial condition to a simulating means 14 which is an analog of certain or all functions of instrumentality 11 and may be an analog or digital computer means, as required. Its main features resides however in the fact that its time scale is accelerated for instance by a factor of 2, 5 or 10. In a practical example the speed of an aircraft toward a target at 500 knots may be simulated at 1500 knots, thus accelerating the time by a factor of three. Often, the simulating means is a simplification of the real system, similar to it in its important aspects, but not perfect in its correspondence.

The signals from sensing means 13 may not always be in suitable form to be acceptable by simulating means 14 but may require to be converted in conversion means 15 to proper form. If for example, one of the sensing instruments measured an angle represented as shaft position, while the same angle requires to be inserted in the simulating means as an electrical voltage, it would be necessary to install a transducer to convert angular shaft position to a corresponding voltage. Similarly, it may be necessary to scale quantities, or to convert analog data to digital data (binary expression et cetera) to be in acceptable form for the simulating means. In still other cases sign inversion, temperature or pressure conversion may be involved.

The information from sensing means 13 and, if required, transformed to a suitable quantity in conversion means 15, is cyclically admitted via cyclic resetting means 16 to the simulating means. Since this information is used merely as initial condition in the simulating means whereupon the simulating means is permitted to operate with these data for a predetermined time interval (e.g. 0.01, 0.1, 1 second, et cetera), the cyclic resetting device performs the function of a gate. This cycling is required because the setting of the input control means may be changed and/or the conditions on the controlled instrumentality change with time (elevator moves from 20 to 12 feet height). Thus, after a certain period of time simulating means 14 must be reset (or zeroized as used in counters and calculators) and a new value corresponding to the changed conditions inserted therein. Even if no change has taken place periodic recycling is required in order to ascertain this very fact.

Periodic resetting and admittance of information to the simulating means performed by cyclic resetting means 16 are well known in the art. In an analog comprising an electrical network of the kind commonly used in the analog computing technique, the cyclic resetting device returns the integrating amplifiers to initial voltages supplied from the real system at the end of each cycle. With the start of a new cycle, the analog system is disconnected from the source of the initial condition voltages, and operates independently until the end of the cycle when the analog system again is returned to initial conditions. Similarly, "zeroizing" in digital computers or resetting of mechanical devices is well known in the art. A typical resetting device for analog computers may be obtained from Donner Scientific Co., Model 3720 "Cyclic Reset Generator."

Indicating means 17 receive the output signal from the simulating means for display to the operator under whose cognizance control means 12 are arranged. In this manner, the operator is made aware of the predicted condition of instrumentality 11 as influenced by its control means. Indicating means 17 therefore show to the operator what functions in the instrumentality he is controlling, what he can expect and what he may be expected to do in future.

Figure 2:
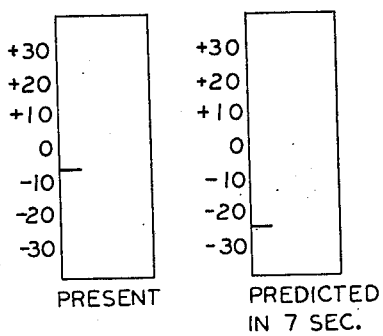
FIGURE 2 is a representation of a typical display which may be achieved when using the control circuit.
Figure 3:
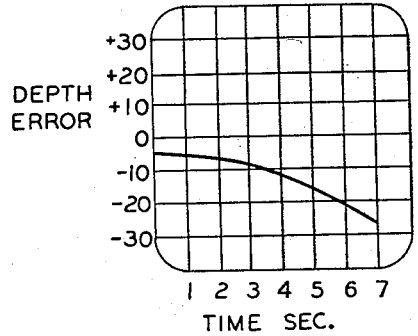
FIGURE 3 is another representation of a display which may be achieved.

The display means may assume two main shapes as illustrated in FIGURES 2 and 3 respectively. When the output is a voltage, a shaft position, et cetera, two instruments disposed side by side are used to indicate "present condition" and "predicted condition." For instance, in a submarine diving control, or elevator control, the present error is about minus 5 feet. If however no corrective action is taken by the operator the error in seven seconds will amount to minus 25 feet. In this manner the operator can take immediate corrective action without having to await his personal observation whether the indicator moves in one or another direction and at what rate of change.

FIGURE 3 shows a display on a cathode ray tube, one axis being time and the other axis being again depth error. Obviously, zero error or drift would occur when the curve or trace on the cathode ray tube is a straight horizontal line. A standard D.-C. oscilloscope circuit is adequate for most displays, one axis of the oscilloscope being driven by a sweep circuit in synchronism with the cylic resetting device means 16. The sweep represents the accelerated artificial time of the simulating means. The vertical axis shows the output signal from the simulating means, or one of the derivatives. At the beginning of each sweep cycle, the display represents the real as well as the analog system, while the remainder of the sweep predicts the course the output signal would take for the predetermined period of time. When the cycling rate is high enough, the operator sees what appears as a continuous trace, showing the present and predicted state. By slowing the cycling and sweep rates, the prediction is extended further into the future; by increasing the sweep rate and cycling, the prediction is for a shorter period of time. Thus, the display means, whether a meter or a cathode ray tube, may remain connected to the simulating means during the entire or a substantial part of the prediction cycle and in this way, will indicate the trend or rate of change of the status of the controlled instrumentality, which rate is a function of the setting of the input controls.

Figure 4:
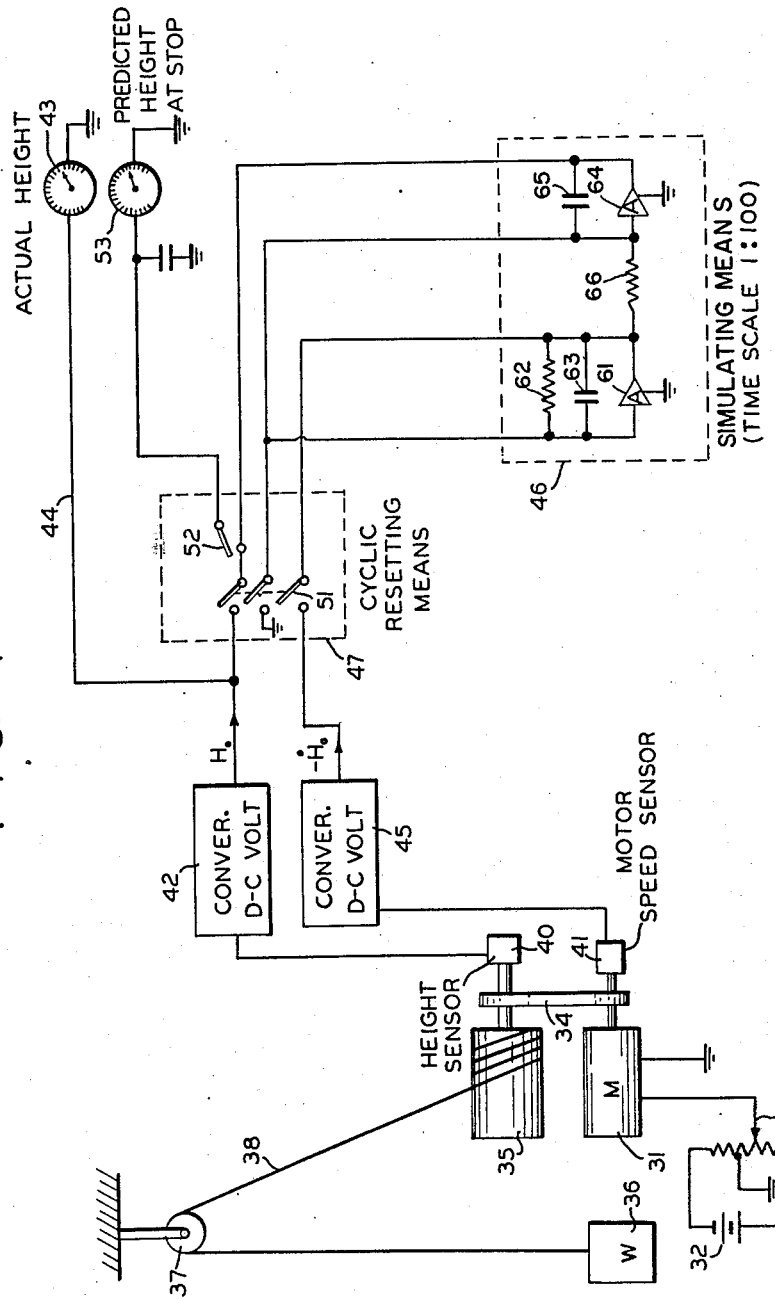
FIGURE 4 is a schematic diagram of a typical embodiment of the invention.

FIGURE 4 illustrates a typical and very simple embodiment of the instant control circuit. The purpose of the circuit is to predict more accurately the stopping of a lift. The diagram represents a device wherein the height of a weight when stopping can be predicted by an electric circuit containing an exponential decay of rate of change of height. Only the predicted height at the stopping point needs to be simulated accurately.

A reversible speed motor 31 energized by source 32 is controlled by a variable speed control 33 and drives via a belt and pulley means 34 a winch 35. The winch lifts or lowers a weight 36 by means of a fixed pulley 37 and cable 38. A height sensor 40 attached to winch shaft provides a signal responsive to the height of the weight and a speed sensor 41 coupled to the motor shaft (e.g. tachometer) produces a signal proportional to the speed of lifting or lowering of the weight. The signal from the height sensor is connected to conversion means 42 to produce a D.-C. signal responsive to the actual height of the weight, the signal being displayed continuously on a D.-C. meter 43 calibrated in height and connected to the conversion means via conductor 44. The motor speed signal is converted to a similar D.-C. voltage in conversion means 45.

Numeral 46 identifies an analog computing means which simulates the stopping characteristics of the apparatus and comprises an amplifier with a decay circuit for the speed signal connected in series with an integrating amplifier receiving the height signal. The computing means receives its input signals which are responsive to height and speed via cyclic resetting means 47.

Switch 51 closes momentarily the circuit to the computing means at the beginning of each cycle to reset the computing means to the initial conditions of actual height and speed. At the end of each computing cycle, switch 52 is closed momentarily to provide instrument 53 with a pulse signal responsive to the predicted height. The capacitor across the instrument serves to smooth the pulses. Instrument 53 therefore will indicate to the operator operating control 33 at which height weight 36 would stop were he to move his control immediately to the "stop" position. Switches 51 and 52 may be cycled by relays, cams, or may be replaced by electronic switching means.

Explaining the operation of the simulating means 46 in greater detail, it will be apparent that the speed of the lift during deceleration is simulated by the output of analog computing amplifier 61, to which resistor 62, and capacitor 63 are connected in parallel as feedback components. When resetting switch 51 closes momentarily, capacitor 63 is charged with a direct current voltage proportional to the speed of the lift at that instant. When switch 51 opens, the charge across capacitor 63 is dissipated through resistor 62. The reduction in voltage corresponds, at 1/100 time, to the reduction in speed of the lift if it would stop at this moment. The magnitudes of resistor 62 and capacitor 63 are selected to make this correspondence as close as possible.

The position of the lift during deceleration is simulated by the output of computing amplifier 64. When resetting switch 51 closes momentarily, feedback capacitor 65 is charged with a direct current voltage proportional to the position (height) of the lift at that instant. When switch 51 opens, the output of amplifier 61, which is proportional to the velocity of the lift, affects amplifier 64 through the latter's input resistor 66. Amplifier 64, with capacitor 65 as its feedback element, constitutes a standard electronic integrator. It integrates the input voltage representing the lift's velocity. This integration, therefore, simulates the change in position of the lift that would occur with stopping. As the velocity voltage approaches zero, the position voltage approaches a stationary value. The magnitude of components 65 and 66 controls the speed of integration, and is chosen to scale the position voltage correctly. This voltage corresponds to the position of the lift as it stops, but at a 100 to 1 time scale, i.e., the voltage change occurs 100 times as fast as the lift stops.

Each prediction cycle may be summarized as follows:

(a) Reset switch 51 closes momentarily, charging capacitors 63 and 65 with direct current voltages proportional to the velocity and position of the lift, respectively.

(b) When switch 51 has opened, the voltage at the output of amplifier 61 drops toward zero exponentially, simulating the decrease in speed of the lift in stopping.

(c) When switch 51 is open, the voltage at the output of amplifier 64 changes more and more slowly, approaching a constant value, simulating the position of the lift as it stops.

(d) Switch 52 closes momentarily near the end of the computing cycle, activating the indicator 53 with the output of amplifier 64 whereby this output corresponds to the position of the lift at the simulated stopped position.

Because conventional analog computing amplifiers are built so that the output voltage inverts the sign of the input voltage, the voltage representing velocity and that representing position of the lift are opposite in sign. For this reason, the output of conversion means 45, which forms the initial condition for amplifier 61 (velocity) is $-H_0$ rather than $H_0$.

The resetting means, 47, is apt, for technical reasons, to be replaced with a somewhat more complicated electronic means than that shown. The principle would, however, be the same.

Figure 5:
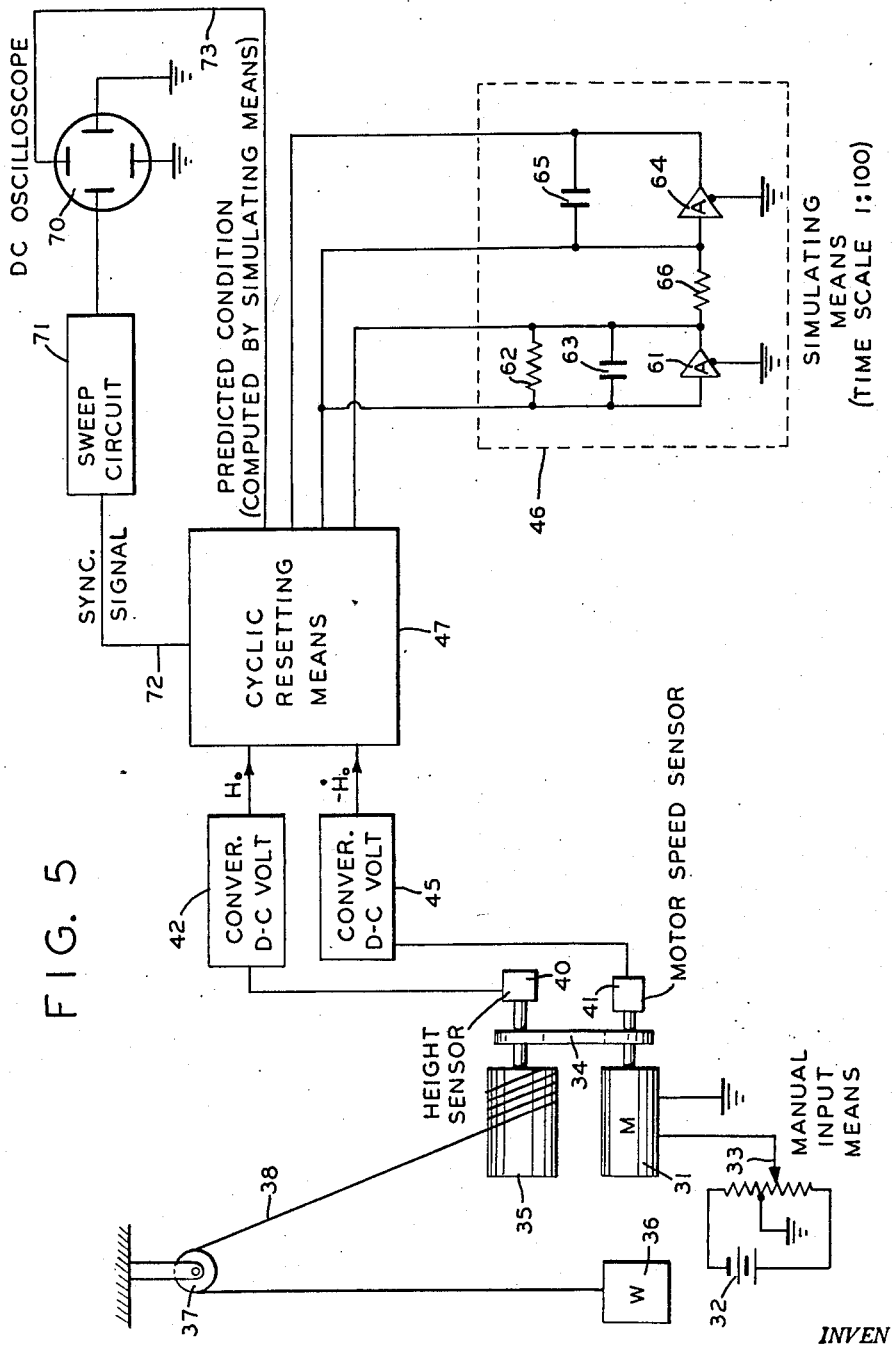
FIGURE 5 is a schematic diagram of an alternative arrangement using the display per FIGURE 3.

FIGURE 5 depicts the same embodiment of the control circuit using however for the display means a cathode ray tube. Conventional oscilloscope 70 with its display cathode ray tube receives along conductor 73 via the resetting means 47, the output from the simulating means 46. This output in the form of a voltage signal is applied across the vertical deflection plates. Across the horizontal deflection plates of the tube, there is applied a timing signal from the conventional sweep circuit 71, the latter being synchronized with the period of the cyclic resetting means via conductor 72. The cathode ray tube therefore, receives a signal which indicates the condition of the lift over the predicted period of time, a display which readily may assume the trace shown in FIGURE 3.

It will be apparent to those skilled in the art that depending upon the type of the output signal provided by the simulating means, conversion means similar to means 15 may be required between simulating means 14 and indicating means 17.

It will be apparent still further to those skilled in the art that the arrangement described hereinbefore provides the operator of a complex controlled instrumentality with more accurate and quicker information about the course the instrumentality he is controlling is going to take. The advantages of this arrangement to the operator include: control is simplified; control is more precise; reliability is increased; learning time is reduced; the operator is kept continuously aware of the present and anticipated state of the instrumentality; the operator is free to choose the most appropriate means of operation.

The extent of the first four advantages is, in systems which have been constructed, large. In one typical control system, a new operator could control the instrumentality more accurately after a period of five minutes than experienced operators with the conventional type of instrumentation.

The first four advantages apply also to command intruments as compared with the usual status instruments. The last two advantages however refer to points of special weakness of command instrumentation, and represent two major advantages of the present invention over command instruments.

Still other advantages will be apparent to those experienced with dangerous instrumentalities, particularly instrumentalities which must be operated close to the danger limit. In many instances, the level of operation can be kept within a wider safety margin.

While there have been described and illustrated certain embodiments of the instant invention, it will be apparent to those skilled in the art that various changes and modifications may be made therein without deviating from the principle and intent of the invention, which should be limited only by the scope of the appended claims.

What is claimed is:

1. In a control circuit of the type described the combination of: a controlled instrumentality; manual input means connected to said instrumentality for controlling the future status of said instrumentality; sensing means connected to said instrumentality for receiving therefrom signals which are responsive to the present state of said instrumentality; a simulating means simulating the operation of said instrumentality on an accelerated time basis; a cyclic resetting means connected to said sensing means and to said simulating means; said resetting means connecting the signals from said sensing means cyclically to said simulating means for causing the latter to produce output signals responsive to the predicted condition of said instrumentality; said resetting means causing said simulating means to operate with a given signal from said sensing means as initial condition for a predetermined period of time and then causing resetting of said simulating means and applying thereto a new signal representative of the then condition of said instrumentality as sensed by said sensing means; a cathode ray tube circuit which includes a sweep signal; said circuit connected to said simulating means for causing the cathode ray tube to display along one of its display axes a signal responsive to the output from said simulating means, and said tube receiving along another of its display axes said sweep signal which is synchronized with the time period of said resetting means, whereby to cause the cathode ray tube to display repetitively a trace whose slope is commensurate with the rate of change of the output signal produced by said simulating means.

2. In a control circuit of the type described the combination of: a controlled instrumentality; manual input means connected to said instrumentality for controlling the future status of said instrumentality; sensing means connected to said instrumentality for receiving therefrom signals which are responsive to the present state of said instrumentality; a simulating means simulating the operation of said instrumentality on an accelerated time basis; conversion means connected to receive the signals from said sensing means and converting them to signals for acceptance by said simulating means; a cyclic resetting means connected to said conversion means and to said simulating means; said resetting means connecting the signals from siad conversion means cyclically to said simulating means for causing the latter to produce output signals responsive to the predicted condition of said instrumentality; said resetting means causing said simulating means to operate with a given signal from said conversion means as initial condition for a predetermined period of time and then causing resetting of said simulating means and applying thereto a new signal representative of the then condition of said instrumentality as sensed by said sensing means; a cathode ray tube circuit which includes a sweep signal; said circuit connected to said simulating means for causing the cathode ray tube to display along one of its display axes a signal responsive to the output from said simulating means, and said tube receiving along another of its display axes said sweep signal which is synchronized with the time period of said resetting means, whereby to cause the cathode ray tube to display repetitively a trace whose length represents future time and whose slope is commensurate with the rate of change of the output signal produced by said simulating means.

3. A control circuit as described and as set forth in claim 2 wherein said display axes are at right angles to one another.

4. A control circuit as described and as set forth in claim 2 wherein said simulating means comprises analog computing means.

5. A control circuit as described and as set forth in claim 2 wherein said simulating means comprises digital computing means.

6. In a control circuit of the type described the combination of: a controlled instrumentality; manual input means connected to said instrumentality for controlling the future status of said instrumentality; sensing means connected to said instrumentality for receiving therefrom signals which are responsive to the present state of said instrumentality; a simulating means simulating the operation of said instrumentality on an accelerated time basis; a cyclic resetting means connected to said sensing means and to said simulating means; said resetting means connecting the signals from said sensing means cyclically to said simulating means for causing the latter to produce output signals responsive to the predicted condition of said instrumentality; said resetting means causing said simulating means to operate with a given signal from said sensing means as initial condition for a predetermined period of time and then causing resetting of said simulating means and applying thereto a new signal representative of the then condition of said instrumentality as sensed by said sensing means; a cathode ray tube circuit which includes a sweep signal; said circuit connected to said simulating means for causing the cathode ray tube to display along a substantially vertical display axis a signal responsive to the output from said simulating means, and said tube receiving along a substantially horizontal display axis said sweep signal which is synchronized with the time period of said resetting means.

7. In a control circuit of the type described the combination of: a controlled instrumentality; manual input means connected to said instrumentality for controlling the future status of said instrumentality; sensing means connected to said instrumentality for receiving therefrom signals which are responsive to the present state of said instrumentality; a simulating means simulating the operation of said instrumentality on an accelerated time basis; a cyclic resetting means connected to said sensing means and to said simulating means; said resetting means connecting the signals from said sensing means cyclically to said simulating means for causing the latter to produce output signals responsive to the predicted condition of said instrumentality; said resetting means causing said simulating means to operate with a given signal from said sensing means as initial condition for a predetermined period of time and then causing resetting of said simulating means and applying thereto a new signal representative of the then condition of said instrumentality as sensed by said sensing means; display means connected to said simulating means for receiving therefrom the output signals and indicating the predicted condition of said instrumentality.

8. In a control circuit of the type described the combination of: a controlled instrumentality; manual input means connected to said instrumentality for controlling the future status of said instrumentality; sensing means connected to said instrumentality for receiving therefrom signals which are responsive to the present state of said instrumentality; a simulating means simulating the operation of said instrumentality on an accelerated time basis; conversion means connected to receive the signals from said sensing means and converting them to signals for acceptance by said simulating means; a cyclic resetting means connected to said conversion means and to said simulating means; said resetting means connecting the signals from said conversion means cyclically to said simulating means for causing the latter to produce output signals responsive to the predicted condition of said instrumentality; said resetting means causing said simulating means to operate with a given signal from said conversion means as initial condition for a predetermined period of time and then causing resetting of said simulating means and applying thereto a new signal representative of the then condition of said instrumentality as sensed by said sensing means; display means cyclically connected to said simulating means for receiving therefrom the output signals and indicating the predicted condition of said instrumentality.

9. In a control circuit of the type described the combination of: a controlled instrumentality; manual input means connected to said instrumentality for controlling the future status of said instrumentality; sensing means connected to said instrumentality for receiving therefrom signals which are responsive to the present state of said instrumentality; a simulating means simulating the operation of said instrumentality on an accelerated time basis; conversion means connected to receive the signals from said sensing means and converting them to signals for acceptance by said simulating means; a cyclic resetting means connected to said conversion means and to said simulating means; said resetting means connecting the signals from said conversion means cyclically to said simulating means for causing the latter to produce output signals responsive to the predicted condition of said instrumentality; said resetting means causing said simulating means to operate with a given signal from said conversion means as initial condition for a predetermined period of time and then causing resetting of said simulating means and applying thereto a new signal representative of the then condition of said instrumentality as sensed by said sensing means; display means connected to said simulating means for a portion of the predetermined period for receiving from the simulating means the output signals and indicating the predicted condition of said instrumentality whereby said portion is of sufficient length for the display means to indicate the rate of change of said instrumentality over said period which corresponds to predicted time range.

10. A control circuit as set forth in claim 9 wherein said simulating means comprises analog computing means.

11. A control circuit as set forth in claim 9 wherein said simulating means comprises digital computing means.

References Cited in the file of this patent

UNITED STATES PATENTS

| | | |
|---|---|---|
| 2,398,522 | Crooke | Apr. 16, 1946 |
| 2,404,011 | White | July 16, 1946 |
| 2,493,183 | Goghosian et al | Jan. 3, 1950 |
| 2,712,414 | Ziebolz | July 5, 1955 |
| 2,784,359 | Kamm | Mar. 5, 1957 |
| 2,817,479 | Newell | Dec. 24, 1957 |
| 2,842,311 | Petrie | July 8, 1958 |